United States Patent [19]

Prikkel, III

[11] 4,046,940

[45] Sept. 6, 1977

[54] WEATHERSTRIP STRUCTURE

[75] Inventor: John Prikkel, III, Dayton, Ohio

[73] Assignee: General Motors Corporation, Detroit, Mich.

[21] Appl. No.: 640,724

[22] Filed: Dec. 15, 1975

[51] Int. Cl.² .................. E06B 7/215; B32B 15/06; B32B 15/14
[52] U.S. Cl. .................................. 428/313; 49/488; 49/490; 49/497; 428/358
[58] Field of Search .............. 428/52, 101, 358, 313, 428/310; 49/488, 490, 491, 496, 497

[56] References Cited

U.S. PATENT DOCUMENTS

| | | | |
|---|---|---|---|
| 2,699,582 | 1/1955 | Schlegel | 49/491 |
| 3,197,821 | 8/1965 | Bright | 49/491 |
| 3,200,448 | 8/1965 | Bright | 49/491 |
| 3,706,628 | 12/1972 | Azzola | 428/358 |
| 3,934,385 | 1/1976 | Paulus et al. | 428/358 |
| 3,939,608 | 2/1976 | Asakai et al. | 49/488 |
| 3,993,819 | 11/1976 | Fewkes | 428/358 |

FOREIGN PATENT DOCUMENTS

| | | | |
|---|---|---|---|
| 607,143 | 8/1948 | United Kingdom | 49/491 |
| 1,002,599 | 8/1965 | United Kingdom | 49/491 |
| 1,020,025 | 2/1966 | United Kingdom | 49/491 |

Primary Examiner—Harold Ansher
Attorney, Agent, or Firm—Charles E. Leahy

[57] ABSTRACT

In accordance with a preferred embodiment of this invention, there is provided an elongated elastomeric weatherstrip, having a longitudinally extending sealing portion and a longitudinally extending U-shaped base portion which clamps the weatherstrip onto a projecting edge flange or the like. A reinforcing and retention aiding core is embedded in the base portion. This core comprises a plurality of resilient U-shaped metal strips disposed transversely to the longitudinal axis of the base portion in closely and uniformly spaced relation therealong; the strips are securely attached at their ends to flexible continuous cords longitudinally disposed in each side wall of the U-shaped section. The base portion also has one or more longitudinally extending projections along the inner surface of the sides of the U-shaped channel to more securely clamp the weatherstrip to the edge flange.

3 Claims, 4 Drawing Figures

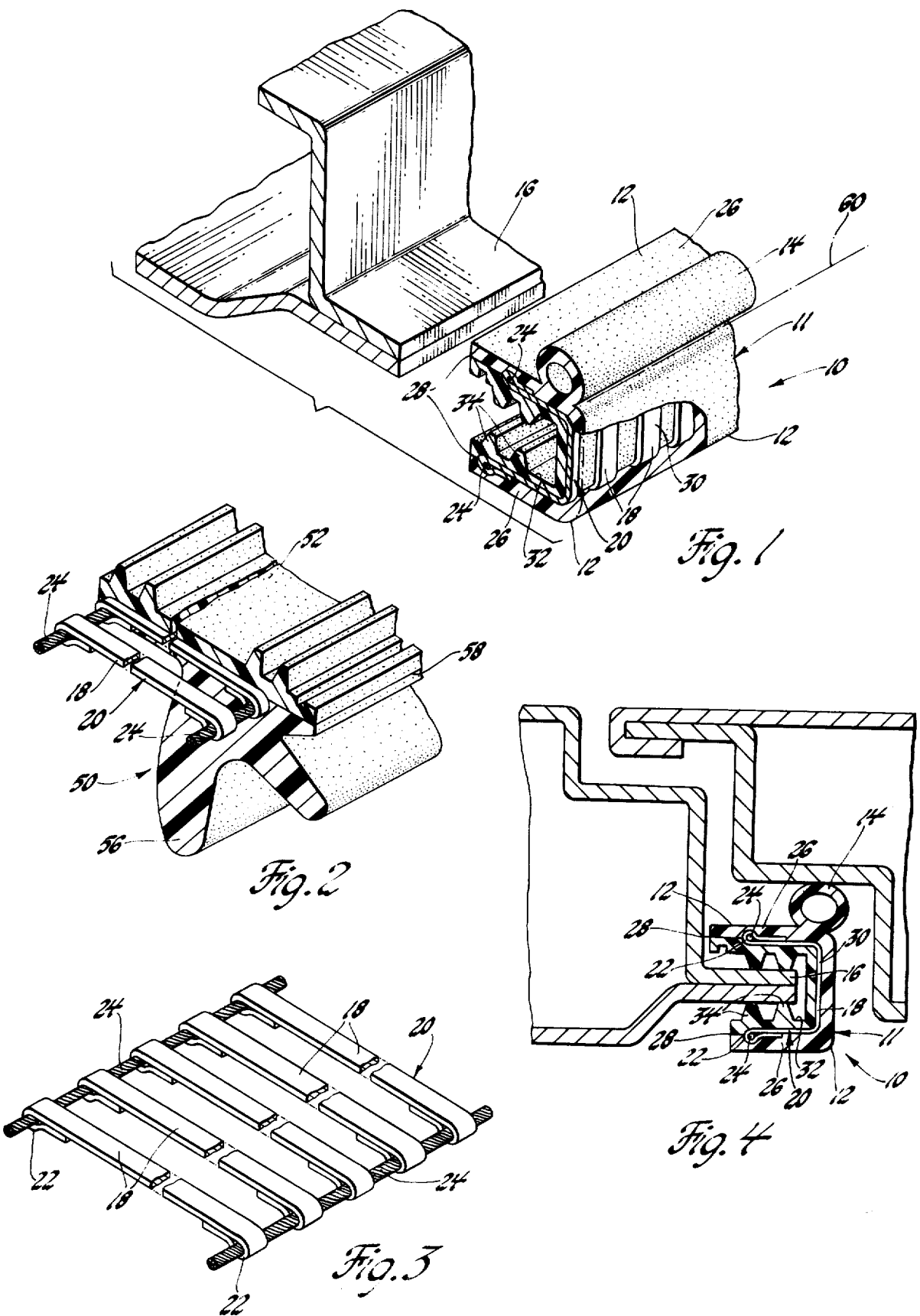

WEATHERSTRIP STRUCTURE

This invention relates to an elastomeric elongated body and more particularly to a weatherstrip.

BACKGROUND OF THE INVENTION

The more recent weatherstrip structures such as those used to seal late model automotive doors, hoods and deck lids have a U-shaped base portion which serves to clamp the weatherstrip to an edge flange or similar projection. Attached to this base portion is a bulbous sealing portion which is typically coextensive with the base portion. A reinforcing and retention aiding core is embedded in the base portion to ensure that the weatherstrip will remain securely fastened to the flange; for this same purpose, the side walls of the U-shaped elastomeric base portion channel may also have inwardly projecting flexible fins.

The core which is embedded in the U-shaped base portion has in the past taken many shapes. Most of these shapes employ a continuous U-shaped metal frame having various shapes, projections, and methods of manufacture.

It has been found that most of the prior art cores have limitations which make them less than desirable in most weatherstrip structures. For example, those cores having a continuous metal frame are difficult to handle especially in manufacturing an elastomeric weatherstrip from a latex. This process typically requires the core to lie evenly and in proper alignment on, or immersed in, a layer of liquid latex which is then cured. This is difficult if the core has a continous metal frame, even if it has perforations to make it relatively flexible, because the continuous frame will, to some degree, retain a memory and tend to twist and revert to some previous shape. This is due to the elastic nature of metals. Comparatively, the use of individual clips to form the core would obviously present severe handling and dispensing problems in any process.

It is an object of this invention to provide an improved elastomeric weatherstrip structure having a U-shaped base portion and embedded therein a novel reinforcing and retention aiding core. This core is basically a plurality of U-shaped strips disposed transversely to the weatherstrip in closely and uniformly spaced relation, and attached, at their ends, to flexible continuous cords embedded in the side walls of the U-shaped base portion. The subject weatherstrip structure is easily manufactured from a latex and is easily assembled onto a suitable edge flange.

The subject invention will be more readily understood in view of the attached drawings which briefly are:

FIG. 1 is a sectional perspective view of a subject weatherstrip structure, partly broken away, and a suitable edge flange prior to assembly;

FIG. 2 is a sectional perspective view of another embodiment of the subject weatherstrip in an "as cast" configuration prior to the deformation of the reinforcing and retention aiding core to form the U-shaped base portion;

FIG. 3 is a perspective view of a section of the subject reinforcing and retention aiding core prior to the manufacture of the weatherstrip; and FIG. 4 is a sectional view of a subject weatherstrip in its intended application.

This invention will now be described in detail with specific reference to the attached drawings. FIG. 1 shows a section of the subject weatherstrip 10 having an elongated elastomeric body 11 comprising a longitudinally extending U-shaped base portion 12 and a longitudinally extending bulbous sealing portion 14. This view shows the weatherstrip 10 prior to its assembly onto edge flange 16.

The reinforcing and retention aiding core 20 is shown embedded in the base portion 12. This core is essentially a plurality of individual resilient strips 18 preferably made of metal transversely disposed to the longitudinal axis 60 of weatherstrip 10 and securely attached at each end 22 to flexible continuous cords 24. The cords 24 are longitudinally disposed and embedded in the side walls 26 of U-shaped base portion 12.

As shown here and in FIG. 3, the strips are disposed in a closely and uniformly spaced relation along the weatherstrip, which relation provides the structure with relative uniformity along its longitudinal axis 60. The strips 18 should be long enough to extend far enough into each side wall 26 of the U-shaped base portion to be bent to a sufficient degree to urge the side walls 26 firmly against flange 16 and thereby securely clamp weatherstrip 10 thereon. Therefore, the shape of base portion 12 is not to be limited to a perfect U form, having parallel side walls. It may in fact be necessary to have the end points 28 of side walls 26 practically touching to provide the required clamping force. This would become especially important if edge flange 16 were relatively thin compared to the width of base sections 30 of strip 18.

The inner surfaces 32 of side walls 26 preferably have one or more longitudinally extending and inwardly projecting fins 34. In another embodiment, the fins may slant toward the base section 30. In either configuration, these fins act cooperatively with strips 18 to securely attach weatherstrip 10 to edge flange 16 and resist any force tending to push the weatherstrip 10 off edge flange 16.

FIG. 2 illustrates an additional preferred embodiment of the subject weatherstrip wherein the weatherstrip has a dual density structure and is formed by a latex casting process. More specifically, weatherstrip 50 is shown in its open "as cast" shape and includes a high density base portion 52 and embedded therein a reinforcing and retention aiding core 20, and a low density cellular sealing portion 56. The base portion 52 will be formed to the desired U-shape prior to final assembly on an edge flange 16. This is accomplished by bending the base portion 52, and more specifically the resilient strips 18 of the core 20, embedded therein, to the desired shape.

Weatherstrip 50 is preferably manufactured by a latex casting technique wherein the sealing portion 56 and the base portion 52 are initially cast in elongated molds and allowed to partially gel. During this initial partial gelling step, the core 20 may be laid on top of either latex. Once this is accomplished and at least one of the portions of the weatherstrip has gelled to a self-sustaining state, the two gelling layers are brought together at line 58 and then fully cured to form the open "as cast" shape of the weatherstrip. Before the base portion 52 is formed into the U-shape, the entire Weatherstrip may be optionally coated with a thin layer of a suitable elastomer to seal the foam portion and to provide abrasion resistance. In this process, the subject core 20 provides several advantages. A principle advantage is that in the flat or open shape, as shown in FIG. 3, the core 20 is easily placed on the surface of a gelling latex with no twists or bends to create alignment or positioning problems.

Suitable latices may be prepared using any number of typical, well-known formulations, such as those described in Volume 34 of the Vanderbilt News which was published in 1972. This reference is specifically incorporated by reference to describe various suitable latex formulations. Suitable resins include natural rubber, acrylonitrile-butadiene-styrene copolymers, butadiene-acrylonitrile copolymers, poly(chloroprene) and mixtures thereof or other synthetic rubber-like materials. Suitable latices should gel in from about 1 to about 3 minutes and may contain from 50 to 80% by weight solids. In addition, these latices may also contain the additives commonly found in rubber latices such as dispersing agents, wetting agents, emulsifying agents, stabilizers, thickeners, and gelling agents. It is to be understood that no one specific type of latex is necessary for the practice of this invention. Typically, the low density foamed latex is formed from the same basic formulation as the high density non-foamed latex and is simply whipped prior to the casting operation to incorporate air therein and form a foam latex having a density of from about 35 to about 75 grams per six ounce cup. However, it is to be understood that the exact density of the sealing portion will depend on a practitioner's particular application.

It is to be noted at this point, that it is also within the scope of this invention to employ a carrier of this type in an elastomeric weatherstrip formed by any of the well-known extrusion processes.

FIG. 3 is a perspective of the reinforcing and retention aiding core 20 in its preformed shape; it is in this open shape that the core is preferably incorporated into the weatherstrip as it is formed during the latex casting process.

The core 20 consists of a plurality of deformable but resilient strips 18 securely attached at each of their ends 22 to flexible cords 24. The strips may be formed from any of the well-known plastically deformable materials such as low carbon steels or the like. The cords may be made of any typical fiber such as cotton. However, the cord should have sufficient dimensional stability, to prevent severe distortion of the weatherstrip's shape, in whatever the environment the weatherstrip may be used.

In the weatherstrip 50 shown in FIG. 2 which is suitable for several automotive applications, the strips are made of a low carbon steel, having a thickness of about 20 mils, a width of about 70 mils, and a length of about 1⅜ inches and are spaced about three-sixteenths of an inch apart. In this same embodiment, the cords are made of cotton and have a diameter of about 70 mils. As is evident from the drawings, the ends of the strips have been bent around the cords and attached thereto by a stapling-like technique. It is to be understood that the subject invention is not dependent on any specific dimensions or materials in the design of the cores and that they should be selected within the context of the practitioner's specific application.

While my invention has been described in terms of certain specific embodiments, it will be appreciated that other forms thereof could readily be adapted by one skilled in the art. Therefore, the scope of my invention is not to be limited to the specific embodiments disclosed.

What is claimed is:

1. An elongated elastomeric body having a longitudinally extending U-shaped section and embedded in said U-shaped section, a reinforcing and retention aiding core comprising a plurality of separate U-shaped resilient metal strips disposed transversely to the longitudinal axis of the body in closely and uniformly spaced relation therealong with the ends of said strips being bent around and thereby securely attached to flexible continuous fibrous cords longitudinally disposed in each side wall of said U-shaped section.

2. An elongated elastomeric body suitable for use as a weatherstrip and comprising:
   a. an elongated sealing portion;
   b. an elongated U-shaped base portion lying parallel to and attached to the sealing portion, the U-shaped base portion intended for embracing engagement with and clamping retention on an edge flange, and embedded in said U-shaped base portion;
   c. a reinforcing and retention aiding core comprising:
      I. a plurality of separate and U-shaped resilient metal strips disposed transversely to the longitudinal axis of the base portion in closely and uniformly spaced relation therealong; the ends of the said strips being bent around and thereby securely attached to
      II. flexible continuous fibrous cords longitudinally disposed in each side wall of said U-shaped section and lying parallel to the longitudinal axis of said elastomeric body.

3. A dual density elongated elastomeric body, suitable for use as an automotive weatherstrip, comprising:
   a. an elongated low-density cellular elastomeric sealing portion;
   b. an elongated high-density elastomeric base portion lying parallel to and attached to the sealing portion, the base portion having a U-shaped section for embracing engagement with and clamping retention on an edge flange, and completely embedded in the U-shaped section;
   c. a reinforcing and retention aiding core comprising:
      I. a plurality of separate and U-shaped resilient metal strips disposed transversely to the longitudinal axis of the base portion in closely and uniformly spaced relation therealong; the ends of the said strips being bent around and thereby securely attached to
      II. flexible continuous cotton fiber cords longitudinally disposed in each side wall of said U-shaped section and lying parallel to the longitudinal axis of said elastomeric body.

* * * * *